United States Patent [19]

Wang

[11] Patent Number: 5,014,966
[45] Date of Patent: May 14, 1991

[54] ADJUSTABLE TELESCOPIC APPARATUS

[76] Inventor: John Wang, No. 129, Tuan-Chu Lane, Tuan-Chu Li, Chiayi City, Taiwan

[21] Appl. No.: 428,211

[22] Filed: Oct. 27, 1989

[51] Int. Cl.$^5$ ............................................. F16F 5/00
[52] U.S. Cl. .................................. 267/64.26; 188/319; 188/269
[58] Field of Search ................... 92/80, 82, 8; 91/4 R; 188/269, 319, 322.15; 267/64.26

[56] References Cited

U.S. PATENT DOCUMENTS

| | | | |
|---|---|---|---|
| 2,335,907 | 12/1943 | Boor et al. | 188/319 |
| 2,351,662 | 6/1944 | Christofel | 188/319 |
| 2,394,355 | 2/1946 | Beecher | 188/319 X |
| 2,780,321 | 1/1953 | Sturari | 188/319 |
| 3,363,518 | 1/1968 | Boissevain | 188/319 X |
| 3,944,198 | 3/1976 | Sakamoto | 267/64.26 X |
| 4,530,425 | 7/1985 | Veaux | 188/319 X |

Primary Examiner—Edward K. Look
Assistant Examiner—Todd Mattingly
Attorney, Agent, or Firm—Knobbe, Martens, Olson & Bear

[57] ABSTRACT

An adjustable telescopic apparatus includes: a master pipe body with an axle opening at one end and a pivot opening at the other end; an operating member adjustably installed in the pivot opening of the master pipe body; a slave pipe body with a closed end and an open end movably disposed in the master pipe body with the closed end extending out from the axis opening of the master pipe body; a throttle member with a piston portion and a plurality of hermetic pieces installed at the open end of the slave pipe body for dividing said master pipe body into an oil containing portion to be filled with hydraulic oil and an air space portion over the piston portion of the throttle member; and a valve member with a threaded body portion installed in the piston portion of the throttle member for being movably adjusted along with the operating member so as to allow the hydraulic oil in the master pipe body to be compressed and expanded therein through the throttle member; whereby, the moving speed and the force required to collapse the slave pipe body into the master pipe body can be optionally adjusted for obtaining desired telescopic operations.

4 Claims, 3 Drawing Sheets

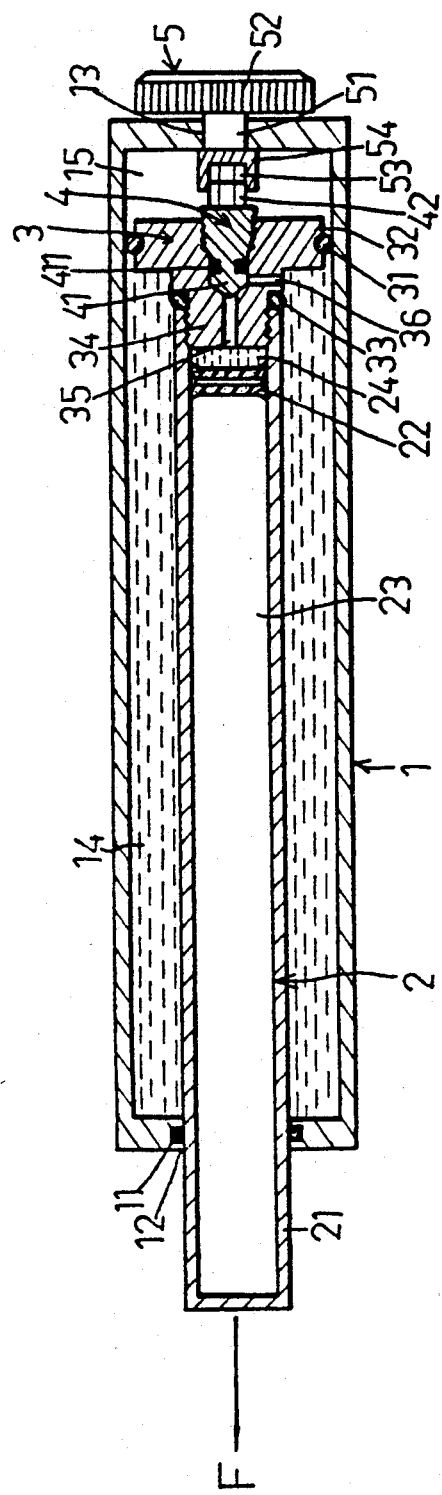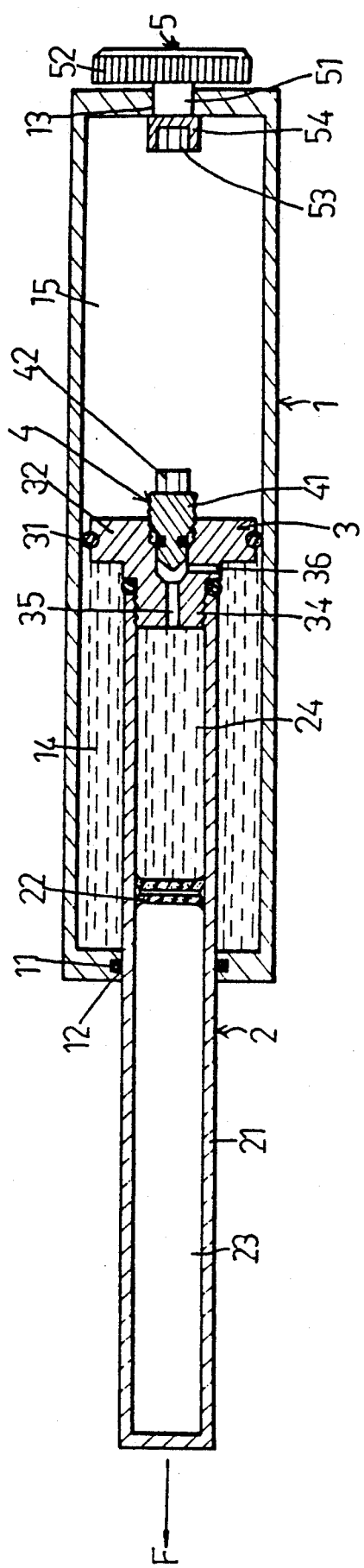

ADJUSTABLE TELESCOPIC APPARATUS

BACKGROUND OF THE INVENTION

This invention relates to a telescopic apparatus, and particularly to a kind of an adjustable telescopic apparatus having a master and a slave pipe body combined together with an oil and an air portion being divided therein for being optionally adjusted to control the moving speed and force required to collapse the slave pipe body into the master pipe body so as to obtain the desired telescopic operations.

Conventionally, telescopic devices are generally classified into spring-operated types and air-compression types. In the former type, a helical spring is usually installed in a double tubing arrangement which, when pressed by an external force, one member of said double tubing arrangement will contract against the helical spring being compressed therein and, when the external force is released, the compressed spring will expand to push said one member of the double tubing arrangement to extend therefrom. In the latter type, compressed gas is used to effect telescopic operations. As shown in FIGS. 1 and 2, a known lift rod, such as that used in a car trunk lid, includes a pipe (A) and a piston rod (B). One portion of the pipe (A) is filled with gas (usually nitrogen) and some lubricating oil. A connecting member A1 provided at an end of the pipe (A) enabling said pipe (A) to be fastened on a car body or door. Another portion of the pipe (A) is provided with a first and a second fixed seal ring A2, A3 placed one in front of the other, at the end thereof. A flexible air-tight ring (usually of a rubber material) A4 is arranged between the two seal rings A1, A2 around the pipe (A) with a pair of circular recesses A21, A31 defined between said two seal rings A2, A3 for obtaining an air-tight effect therewith. The piston rod (B) includes a round piston B1 at one end with an opening B2 formed therein and a coupling member B3 extending out from the sealed end of the pipe (A).

The operations of this known lift rod is as shown in FIG. 2. When a user pushes down the car trunk lid, which is supported by said lift rod, causing a downward pressing force (F) to be applied to the piston rod (B), which is moved into the pipe (A), a first and a second spaces (I), (II) will be created therein. At this stage, the gas pressure PI in the first space (I) will be gradually greater than the gas pressure PII in the second space (II) so that the gas in the first space (I) will be forced to pass through the opening B2 in said piston B1 and enter into the second space (II), equalizing the gas pressure in both spaces (I) and (II), (i.e. PI=PII), so that the lift rod is kept in a retracted condition. When the pressing force (F) is released from said lift rod, i.e. when the car trunk lid is open, the gas pressure in the second space (II) of pipe (A) will be greater than that of the first space (I) of the pipe (A), the piston rod (B) will be gradually moved out from said pipe (A) since the opening B2 of said piston B1 is not big enough to quickly allow the gas from the second space (II) to pass therethrough, resulting in the desired slow lifting operation.

A common drawback suffered by the above-described prior art is that since the extension and the speed of the stretching resistance and retracting speed thereof are normally fixed at the site of manufacture, application of said prior art is very limited, unless various said stretching resistances and retracting speeds are provided in conformity with various needs of the prior art, often causing a considerable inconvenience.

SUMMARY OF THE INVENTION

It is accordingly a primary object of the present invention to provide an adjustable telescopic apparatus with a throttle and valve means by which the stretching resistance and the retracting speed of the telescopic apparatus can be adjusted so as to increase the applicability thereof.

This and other objects of the present invention are achieved by the provision of an adjustable telescopic apparatus which comprises: a master pipe body having an axle opening formed at one end thereof and a pivot opening located at the other end thereof; an operating member adjustably disposed in the pivot opening of said master pipe body; a slave pipe body with a closed end and an open end thereof movably disposed in said master pipe body with the closed end portion of said slave pipe body extending out from the axle opening of said master pipe body through an oil seal provided in said axle opening; a throttle member with a piston portion, a connecting portion and a plurality of hermetic pieces provided in said piston portion and said connecting portion, installed in the open end of said slave pipe body with said piston portion dividing said master pipe body into an oil containing portion to be filled with hydraulic oil therein and an air space portion over said piston portion; a valve member with a threaded body portion adjustably installed in the piston portion of said throttle member for being moved to engage or disengage with said operating member so as to effect the compression and expansion of the hydraulic oil in said master pipe body; and a movable piston member provided in said slave pipe body for defining an oil chamber and a pressurized gas chamber therein. In addition, the connecting portion of said throttle member is provided with vertical oil passage and a horizontal oil channel so as to allow the hydraulic oil in said master pipe body to flow between the oil containing portion of said master pipe body and the oil chamber of said slave pipe body under the control of the valve member and the operating member. Whereby, when the telescopic apparatus is arranged to perform telescopic operations, the moving speed and the applied force of said slave pipe body can be optionally adjusted via the operating member so as to obtain the desired telescopic operations.

Other advantages and characteristics of the present invention will become apparent from the following detailed description of a preferred embodiment when read in conjunction with the accompanying drawings.

BRIEF DESCRIPTION OF THE DRAWINGS

FIG. 3 is a sectional view of a preferred embodiment of a telescopic apparatus in a retracted condition according to the present invention; and FIG. 4 is a sectional view of the preferred embodiment shown in a stretched condition.

DETAILED DESCRIPTION OF THE PREFERRED EMBODIMENT

Figure 1:
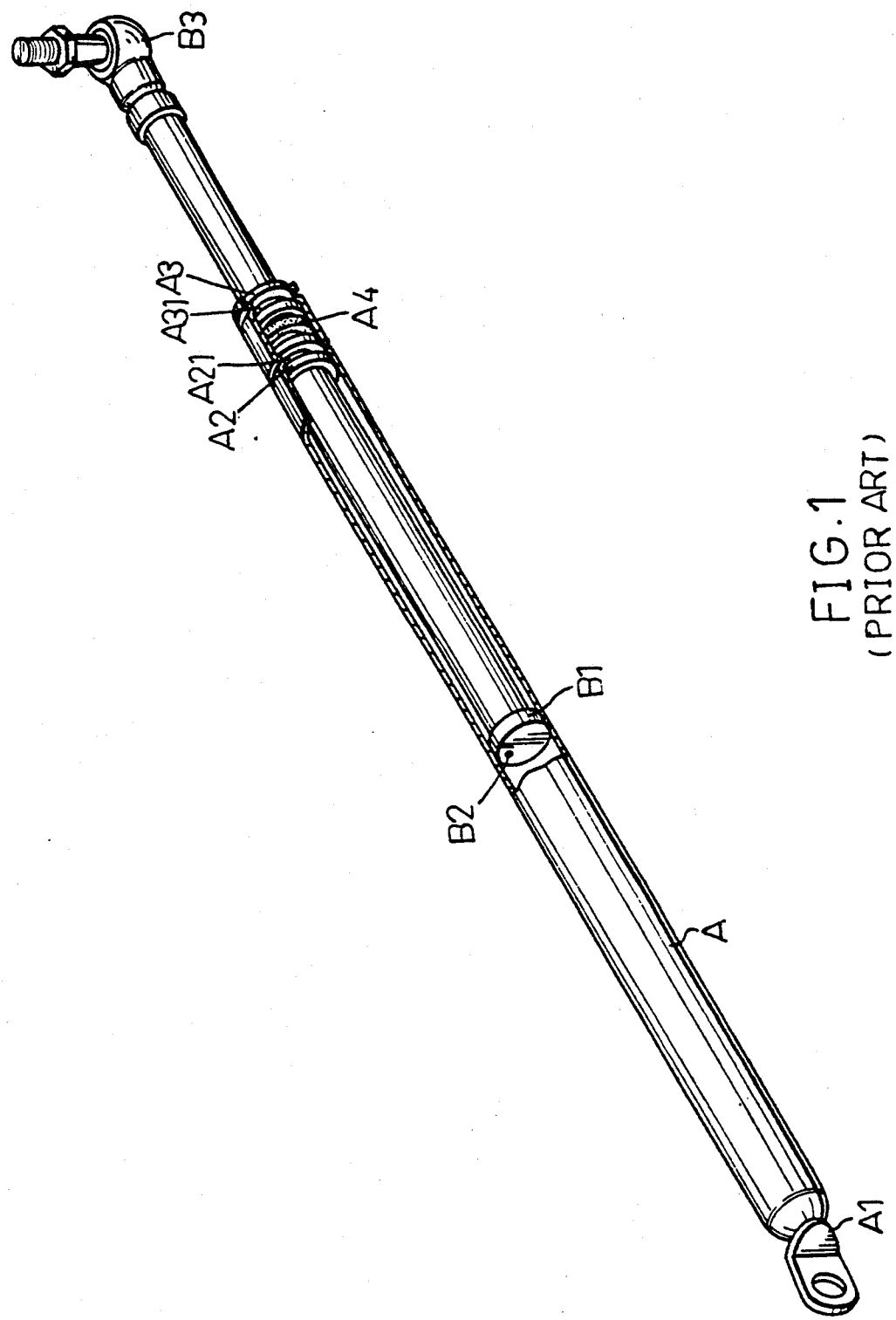
FIG. 1 is a perspective view of a known lift rod.
Figure 2:
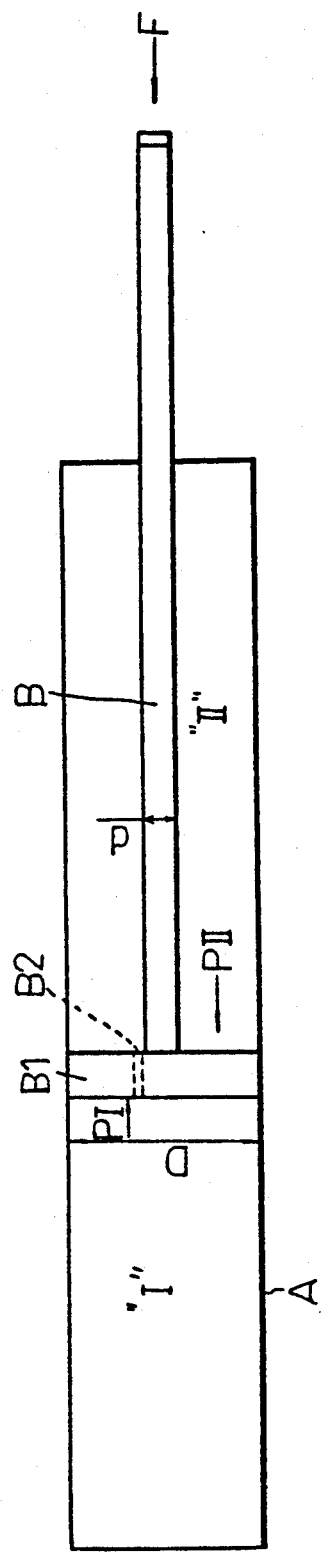
FIG. 2 is a schematic operational illustration of the known lift rod shown in FIG. 1.

Referring to FIG. 1, the preferred embodiment of an adjustable telescopic apparatus according to the present invention comprises: a master pipe body 1 formed with an axle opening 12 at one end thereof and a pivot opening 13 at another end thereof; a slave pipe body 2 movably disposed in said master pipe body 1 with a closed end portion 21 extending out from the axle opening 12 where an oil seal 11 is provided for making close engagement with the closed end portion 21 of said slave pipe body 2; a throttle member 3 matched with a valve member 4 disposed at the open end of said slave pipe body 2 within said master pipe body 1 so as to define an oil containing portion 14 and an air-space portion 15 therein; and a movable piston member 22 installed in said slave pipe body 2 to divide the same into a pressurized gas chamber 23 for the containment of a highly pressurized gas (such as nitrogen) therein and an oil chamber 24 for receiving hydraulic oil therein.

The throttle member 3 disposed at the open end of said slave pipe body 2 includes a piston portion 32 having a first hermetic piece 31 disposed therearound closely abutted upon the inner wall of said master pipe body 1, and a connecting portion 34, having a second hermetic piece 33 fitted therearound, with one end thereof fixed to said piston portion 32 and the other end thereof screw-connected to the inner wall of an open end of said slave pipe body 2. In addition, the connecting portion 34 of said throttle member 3 also includes an oil passage 35 vertically formed in the center part thereof in communication with the oil chamber 24 of said slave pipe body 2, and an oil channel 36 horizontally provided therein in communication with said oil passage 35 and the oil containing portion 14 of said master pipe body 1 so as to enable the hydraulic oil therein to flow into the oil chamber 24 of said slave pipe body 2.

The valve member 4 includes: a threaded body portion 41, having a third hermetic piece 411 disposed at a front part thereof, screw-inserted into the connecting portion 34 in line with said oil passage 35 thereof through said piston portion 32 with a rear part of the threaded body portion 41 extending from the top end of said piston portion 34, wherein the front part with the third hermetic piece 411 of said threaded body portion 41 can be adjustably positioned at the intersecting point of said oil channel 36 and the oil passage 35 of the connecting portion 34 of said throttle member 3 so as to block the oil flow thereat; and a hexagonal adjustment piece 42 located at the top end of the rear part of said body portion 41 for being moved to engage or disengage with the operating member 5 for making the adjustment of said body portion 41.

The operating member 5 includes: a pivot arm 51 rotatably disposed in the pivot opening 13 of said master pipe body 1; a retaining member 54, having a gripping socket 53 formed in conjunction with the hexagonal adjustment piece 42 of said valve member 4, located at the end of said pivot arm 51 within the air space portion 15 of said master pipe body 1; and a setting knob 52 fixed at another end of the pivot arm 51 and located at the top end of said master pipe body 1.

Under normal conditions, the gas pressure in the gas chamber 32 of said slave pipe body 2 of the preferred embodiment will be sufficient to keep the hexagonal adjustment piece 42 of said valve member 4 detachably held in the gripping socket 53, as shown in FIG. 3, for being adjusted by said operating member 5 to block the oil channel 36 via the third hermetic piece 411 of the threaded body portion 41 of said valve member 4. In this condition, when an external pull force (F) is applied on the slave pipe body 2 to draw out the same from the master pipe body 1, due to the fact that the amount of the hydraulic oil in the oil containing portion 14 of said master pipe body 1 remains unchanged and cannot be pressed out therefrom, the preferred embodiment of the telescopic apparatus is in a balanced condition, thus preventing said slave pipe body 2 from being drawn out from said master pipe body 1.

Referring to FIG. 4 in connection with FIG. 3, when the preferred embodiment of the telescopic apparatus is used under certain resistance, the setting knob 52 of said operating member 5 is turned to rotate the threaded body portion 41 backward therefrom so as to move the third hermetic seal 411 from the intersecting point of said oil passage 35 and said oil channel 36. At this stage, when an external pull force F1 is applied to the slave pipe body 2, the compressed hydraulic oil in the oil containing portion 14 of said master pipe body 1 will be forced to gradually flow into the oil chamber 24 of said slave pipe body 2 through the oil channel 36 and the oil passage 35. Meanwhile, since the piston member 22 is movably arranged in said slave pipe body 2, the oil volume which gradually increases in the oil chamber 24 will force the piston member 22 to move toward the gas chamber 23 of said slave pipe body 2, compressing the gas in said gas chamber 23 to a degree of pressure that can return the piston member 22 back to its original position. Consequently, as said slave pipe body 2 is gradually pulled out, the hexagonal adjustment piece 42 of said valve member 4 is disengaged from the gripping socket 53 of said operating member 5, resulting in the extension of said slave pipe body 2 from said master pipe body 1, as shown in FIG. 4.

When the external pull force (F) is discontinued, owing to the expansion of the compressed gas pressure in the gas chamber 23 of said slave pipe body 1, the movable piston member 22 is pressed backward, forcing the hydraulic oil in the oil chamber 24 to flow out from the oil passage 35 and the oil channel 36 of the throttle device 3 into the oil containing portion 14 of said master pipe body 1. The continuously increasing pressure of the hydraulic oil in the oil containing portion 14 of said master pipe body 1 will push the piston portion 32 backward until the hexagonal adjustment piece 42 of said valve member 4 is again detachably engaged with the gripping socket 53 of the operating member 5, as shown in FIG. 3.

The above-described preferred embodiment of the telescopic apparatus according to the present invention can be applied in various ways, such as being installed on a door, adapted in a piece of exercise equipment, etc. When the preferred embodiment is installed on a door, the opening of the door pulls out the slave pipe body 2 from the master pipe body 1. When a person has passed through the door and the opening force is released therefrom, the retraction of the slave pipe body 2 will drive the door to close. The opening and closing speed of the door in relation to the magnitude of the motion resistance of the preferred embodiment can be optionally adjusted via the operating member 5. When the preferred embodiment is adapted in a piece of exercising equipment, such as that for increasing the arm strength of the user, the amount of force needed to be applied to collapse the slave pipe body 2 into the master pipe body 1 can be set by the user in advance through the adjustment of the operating member 5, and the adjustment (for obtaining different resistances of the slave pipe body 1) can be repeatedly made according to the exercising requirement of the user.

Having thus described the invention, it is to be understood that many embodiments thereof will suggest themselves without departing from the spirit and scope of the invention. Therefore, it is intended that the specification and drawings be interpreted as illustrative rather than in a limiting sense, except as defined in the appended claims.

What is claimed is:

1. An adjustable telescopic apparatus comprising:
   a master pipe body having an axle opening formed at one end thereof with an oil seal provided on said axle opening, and a pivot opening located at the other end thereof for accommodation purposes;
   an operating means adjustably installed at the other end of said master pipe body through the pivot opening thereof for making an adjustment therewith;
   a slave pipe body, whose diameter is smaller than that of said master pipe body, with a closed end and an open end thereof movably disposed in said master pipe body through said axle opening thereof for effecting telescopic movements therein;
   a movable piston member disposed in said slave pipe body for dividing the same into a gas chamber and an oil chamber;
   a throttle means movably disposed in said master pipe body in connection with the open end of said slave pipe body for dividing said master pipe body into an oil containing portion and an air space portion thereof so as to enable said oil containing portion to be filled with sufficient hydraulic oil to effect compression and expansion therewith; and
   a valve means threadedly connected with said throttle means in conjunction with said operating means for being turned to control the flow of said hydraulic oil between the oil containing portion of said master pipe body and and the oil chamber of said slave pipe body; whereby, the moving speed and force required to collapse said slave pipe body into said master pipe body can be optionally adjusted via said operating member for obtaining different telescopic operations.

2. An adjustable telescopic apparatus according to claim 1 wherein said operating means comprises:
   a pivot arm rotatably disposed in the pivot opening of said master pipe body;
   a retaining member, having a gripping socket provided at an end of said pivot arm and located in the air space portion of said master pipe body; and
   a setting knob fixed at another end of said pivot arm and situated at a top end of said master pipe body; so that by turning said setting knob, said pivot arm, together with said gripping socket can be rotated in said master pipe body for performing adjustment therewith.

3. An adjustable telescopic apparatus according to claim 1 wherein said throttle means comprises:
   a piston portion having a first hermetic piece disposed therearound movably abutted upon an inner wall of said master pipe body; and
   a connecting portion having a second hermetic piece disposed therearound with one end thereof fixed to said piston portion and another end thereof screw-connected to an inner wall of the open end of said slave pipe body, said connection portion further including an oil passage vertically formed in a center part thereof in communication with the oil chamber of said slave pipe body and an oil channel horizontally provided therein in communication with said oil passage and the oil containing portion of said master pipe body so as to enable the hydraulic oil of said master pipe body to flow into the oil chamber of said slave pipe body.

4. An adjustable telescopic apparatus according to claim 1 wherein said valve means comprises:
   a threaded body portion, having a third hermetic piece disposed at a front part thereof, screw-inserted into the connecting portion in line with the oil passage thereof with a rear part of said threaded body portion extending from a top end of the piston portion of said throttle means, wherein the front part with the third hermetic piece of said threaded body portion can be adjustably positioned at an intersecting point of the oil channel and the oil passage of said connecting portion so as to block an oil flow thereat; and
   a hexagonal adjustment piece located at a top end of the rear part of said threaded body portion for being moved to engage and disengage with the gripping socket of the pivot arm of said operating means along with the adjustment of the setting knob thereof so as to adjust the threaded body portion of said valve means to obtain a desired telescopic speed and force required to collapse said slave pipe body into said master body.

* * * * *